April 15, 1969  C. F. BUSH  3,438,827

METHOD OF MANUFACTURE OF A TIRE

Original Filed April 19, 1965

INVENTOR.
CHARLES F. BUSH

BY

AGENT

April 15, 1969   C. F. BUSH   3,438,827
METHOD OF MANUFACTURE OF A TIRE
Original Filed April 19, 1965   Sheet 2 of 2
FIG. 2
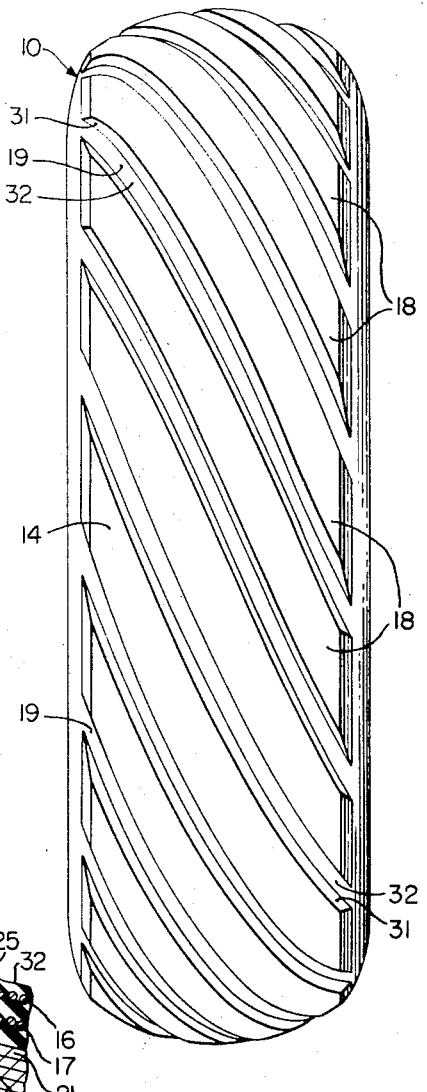
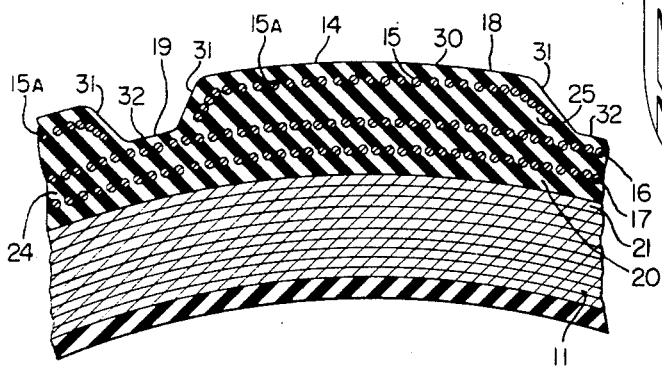
FIG. 4
INVENTOR.
CHARLES F. BUSH
BY
AGENT United States Patent Office 3,438,827
Patented Apr. 15, 1969

3,438,827
METHOD OF MANUFACTURE OF A TIRE
Charles F. Bush, Cuyahoga Falls, Ohio, assignor to The Goodyear Tire & Rubber Company, Akron, Ohio, a corporation of Ohio
Original application Apr. 19, 1965, Ser. No. 452,044, now Patent No. 3,299,935, dated Jan. 24, 1967. Divided and this application Sept. 28, 1966, Ser. No. 582,603
Int. Cl. B29h 17/10; B60c 11/04
U.S. Cl. 156—128         5 Claims

ABSTRACT OF THE DISCLOSURE

The process of applying reinforcing cords in the tread ribs of an airplane tire by applying cords parallel to the ribs in the tread rubber layer and when molding dividing the cords by the pressure of the groove making projections of the mold, so that beneath the final grooves of the tire these cords do not appear having been forced apart to embed in the ribs.

---

This application is a division of an earlier filed co-pending application Ser. No. 452,044, filed Apr. 19, 1965, now Patent No. 3,299,935, which is a continuation-in-part of application Ser. No. 301,271 filed Aug. 12, 1963, and now abandoned.

This invention relates to an improved tire construction and, more particularly, to a tire construction and method of fabricating a tire having tread reinforcements which are particularly adapted for aircraft and which are operated at high speeds.

The centrifugal force developed at high speeds on aircraft tires tends to throw the tread off the tire body and subjects the innerface between the tire and the tread to very great stresses. It is conventional practice to provide high-speed aircraft tires with circumferentially continuous fabric plies in the tread having cords extending transversely of the tread. Although this solution has solved the problem of throwing of the tire tread, it has resulted in the problem of rupturing and/or fraying of those cords in one or more of the plies in the tread extending underneath the anti-skid grooves of the tire. Such rupturing and/or fraying of the cords in the tread grooves results in a weakening of the tread reinforcement which can cause rib undercutting with resulting tread separation and throwing of the tread.

It is an object of this invention to provide a tire having a reinforced tread construction which eliminates rupturing and/or fraying of the tread reinforcing ply or plies adjacent the anti-skid grooves.

A further object of the invention is to provide a novel and improved method of fabricating a tire to provide a tread reinforcement in which at least the radially outermost ply of the tread reinforcement consists of a plurality of individual or discrete ply sections, one such section being positioned in each anti-skid element or rib of the tire.

These and other objects will become more apparent from the following description when read in reference to the drawings in which—

FIG. 2 is a plan view showing the tire tread;

FIG. 4 is an enlarged partial cross-sectional view taken along the lines 4—4 of FIG. 1.

Figure 1:
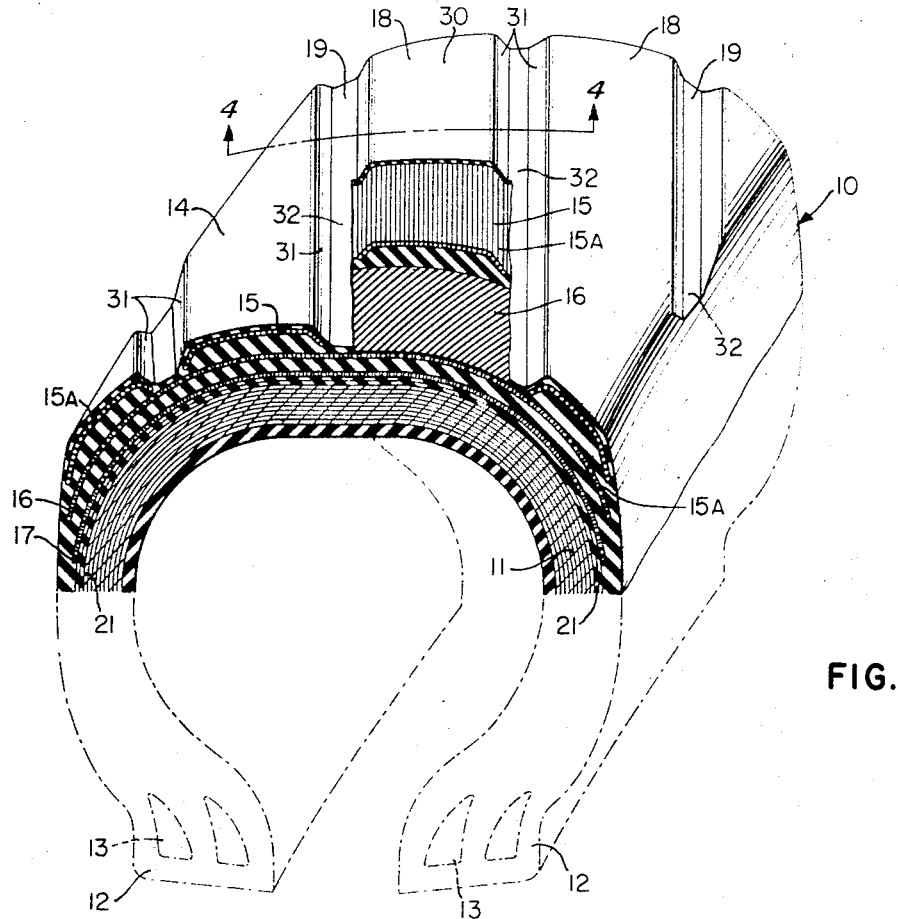
FIG. 1 is an isometric view of a tire constructed in accordance with the embodiment of this invention.

Referring to the drawings, a tire 10 is shown in FIGS. 1 and 2 which is suitable for mounting on the wheel of an airplane which lands at very high speeds, substantially exceeding 160 miles per hour. The completed tire 10 is in the form of an annular hollow body or carcass 11 which includes the usual bead portions 12, 12 disposed in the margins of the opening and having one or more bead rings 13 in each of the bead portions 12 for retaining the tire on a rim of a tire at high speeds. The carcass 11 is made of a plurality of cord plies embedded in resilient rubber or other rubber-like material in which the cords extend from bead to bead.

The tread 14 of suitable tread rubber forms the radially outer surface of the tire which is embedded at least one tread ply 15 spaced from both the tread surface and from the carcass 11. For purposes of illustrating this invention, a group of oppositely biased tread reinforcing plies 15, 16 and 17 are shown embedded in the tread 14 of the tire to resist distortion of the profile of the tread by centrifugal forces exerted upon the tire at high speeds. The tread plies 15, 16 and 17 in the tread 14 are spaced one from another radially of the tread in the area of the circumferentially spaced anti-skid elements or ribs 18 which are formed by intervening tread grooves 19. The tread plies 15, 16 and 17 extend across the tread 14, terminating short of the bead portions 12, and the innermost ply 17 is spaced from the carcass 11. The cords of each of the plies 15–17 extend at an angle to the centerline of the tire. However, the cords of the ply 16 are inclined in an opposite direction, or are oppositely biased with respect to the cords of the plies 15 and 17.

Figure 3:
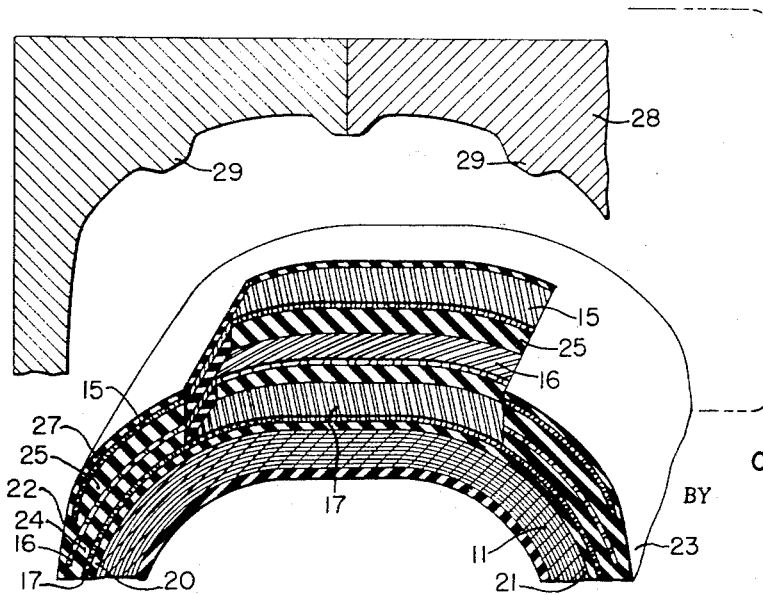
FIG. 3 is a view similar to FIG. 1 with parts broken away and in cross section showing the tire immediately prior to molding of the tread.

As shown in FIG. 3, after the carcass or body of the tire has been built, preferably by the flat band method, a layer of rubber 20 is applied to the crown area of the body or carcass 11 over the outermost body ply 21 from the shoulder area 22 to the opposite shoulder area 23. The ply 17 is then applied, and an additional layer of rubber 24 is applied on the outer surface of the ply 17. The plies 16 and 15 are applied in like manner with an intervening layer of rubber 25 between the plies 16 and 15 and an outer layer 27 over the ply 15. The tire, with the tread built up in the foregoing manner to radially space the tread plies from the carcass 11 and from each other, is then shaped and inserted into a mold having a tread matrix 28 with inwardly extending projections or ribs 29 which form tread grooves 19 in the tire tread 14. The tread matrix projections or ribs 29 are of sufficient length to provide that the tread grooves 19 will extend preferably completely across the tread from shoulder 22 to shoulder 23. In the cured tire the ribs 18 also extend at substantially the same angle and in the same direction, relative to the centerline of the tire, as do the cords in the outermost tread ply 15.

The outer ply 15 of the green tire is spaced from the outer surface of the outer tread layer 27 a distance less than the depth of tread grooves 19, or, in other words, less than the height of the mold projections 29. Also, as noted above, the cord angle of the outer ply 15 is in the molded or cured tire equal, at least approximately, to the angle that the mold projections 29 make with the centerline of the tire in the mold. Therefore, as the green tread is expanded into the mold tread matrix 28, and as the projections or ribs 29 embed themselves into the green unvulcanized tread, the ribs 29 will force the ply 15 apart at the base of the tread grooves 19 as these grooves are formed. The initially unitary radially outer ply 15 is thus split or divided into a plurality of isolated individual or discrete ply segments 15A, one being located within each tread rib 18. The cords of each of the segments 15A extend parallel to the edges of the tread ribs 18 and, thus, the tread grooves 19. The plies 15A are longitudinally and laterally coextensive with the respectively associated tread ribs 18 and are positioned closely adjacent to the tread surface 30. During the molding of the tire the lateral edge of each ply segments next adjacent a tread groove 19 is inclined inwardly of the tire, whereby the lateral edge portion of the ply segment will be in the sidewall of the groove of the cured tire. The corresponding angular relationship of the cords of the ply 15 and the tread grooves 19 in the molded tire assures that no cord of the ply 15 will extend continuously from a point above the base 32 of a tread groove on one side of the groove to a point above the base 32 of the groove on the other side of the groove. Rather, each of the cords of the ply 15 next adjacent a tread groove will extend parallel to the longitudinal axis of the groove and at a substantially uniform distance from the overlying portion of the outer surface 30 of the tread. Thus, even though the cord may be spaced radially outwardly of the base 32 of the groove, or lie beneath a sidewall or the base of the groove, the cord will not tend to pull out into the groove when the tire is deformed so as to tend to elongate the cord, or place it in tension. While in the molding process the mold projections 29 tend to separate the ply 15 into discrete sections, the extent of separation of the ply will depend on the sharpness of the mold projection, the depth of the tread grooves, the physical characteristics of the tread rubber and the ply 15, the spacing of the ply 15 from the outer surface 30 of the tire, etc. Accordingly, while it is preferred that the ply sections 15A be formed so that the side edges of each ply section are disposed within the respectively associated tread rib 18 and, thus, terminate above, or at least not below, the base of the associated grooves, if a portion of a ply segment is located "under" a tread groove, the cord or cords thereof will still extend parallel to the groove and the overlying portion of the outer surface 30 of the tread so that these cords will not pull out into the groove upon deformation of the tire. It will also be noted that, as shown in FIG. 4, if the plies 15–17 initially have an equal number of cords per unit length, when the ply 15 is separated into a plurality of laterally spaced discrete sections, the average number of cords per unit of width of the segments 15A will be greater than that of the plies 16 and 17. More particularly, the cords of the edge portion of each ply section 15A next adjacent a tread groove will be disposed closer to each other than are the center cords of the ply section.

The tire of this invention has been illustrated with the angularity of the cords of each of the outermost tread plies 15A and the angularity of the grooves 19 being approximately 25° relative to the centerline of the tire. Since in the flat band method of tire manufacture the cords of the tread plies, as well as the carcass plies, change their angularity during the shaping operation so that the final angularity of these cords is less than that of the angularity of the plies when the uncured or green tread is built, the angularity of the cords in the ply 15 when applied to the unshaped tire may be approximately 35°, or some 10° less than the angularity thereof in the cured tire. Of course, in retreading a tire the cords of the green tread plies would not shift substantially, and, therefore, the angularity of the cords of the outermost tread ply 15 as applied in the retreading of a tire would be substantially the same as the angulartiy of the groove-forming ribs of the retread matrix.

It is thus seen that in the completed vulcanized tire, the cords of the outermost tread ply 15 extend in a direction parallel to the grooves 19 and do not extend across the bases 32 of the grooves 19. Since the next adjacent tread ply 16 is not located in the tread ribs 18, even though the cords of this ply extend at any angle to and across the tread grooves, the cords of this ply will not tend to pull out into the tread grooves, and the tire in operation will not exhibit ruptured or frayed tread plies at the base 32 of the tread grooves.

Although this invention has been described and illustrated with tread grooves extending across the tread at an angle of approximately 25° relative to the centerline of the tire, it is understood that the grooves may extend at any acute angle relative to the centerline of the tire, preferably between 15 and 45°. The invention has also been described and illustrated with the grooves extending continuously transversely from one side of the tire tread to the other, but the invention contemplates that the grooves may be interrupted by a bridge of tread stock, or the transverse grooves on one side of the centerline of the tire may be offset circumferentially about the tire relative to the grooves on the other side of the tread centerline.

Unless otherwise specified, as used herein, the term "rubber" includes both natural and man-made rubber materials, and the term "cord" includes both natural and synthetic elongated tension elements.

While certain representative embodiments and details have been shown for the purpose of illustrating the invention, it will be apparent to those skilled in this art that various changes and modifications may be made therein without departing from the spirit or scope of the invention.

I claim:

1. A method of building and curing at least the tread portion of a pneumatic tire of a type having in the cured condition of the tread portion a plurality of parallel tread grooves forming intervening parallel traction elements, comprising the steps of locating in the green tread portion a cord ply spaced inwardly from the outer surface of the green tread portion a distance substantially less than the depth of said grooves in the cured tread portion with the cords of said ply extending in a direction relative to the centerline of said green tread portion such that the cords in the cured tread portion will be parallel to said grooves, and molding said tread portion simultaneously to provide said grooves and to divide said ply into a plurality of ply segments disposed respectively in said traction elements with the cords of said segments extending parallel to said grooves.

2. A method of building and curing at least the tread portion of a pneumatic tire of a type having in the cured condition of the tread a plurality of parallel tread grooves forming intervening traction elements and a plurality of cord tread plies arranged in overlying relation to each other with the cords of the radially outermost tread ply extending parallel to each other and angularly of at least one of the underlying tread plies, comprising the steps of locating the radially outermost tread ply in the green tread portion at a distance from the outer surface of the green tread portion substantially less than the depth of said grooves, locating the next radially inner tread ply having cords extending angularly of the cords of the radially outermost tread ply at a distance from said outer surface substantially greater than the depth of said grooves, and simultaneously molding said grooves and dividing said outermost ply into a plurality of ply segments the cords of which extend parallel to said grooves.

3. A method of building and curing at least the tread portion of a pneumatic tire of a type having in the cured condition of the tread portion a plurality of parallel tread grooves forming intervening parallel traction elements, comprising the steps of locating in the green tread portion a cord ply spaced inwardly from the outer surface of the green tread portion a distance substantially less than the depth of said grooves in the cured tread portion with the cords of said ply extending in a direction relative to the centerline of said green tread portion such that the cords in the cured tread portion will be parallel to said grooves, and curing said tread portion in a mold having projections which are shaped to simultaneously form said grooves and exert a force on said ply to tend to separate the ply laterally of said grooves and into a plurality of discrete ply segments disposed at least primarily respectively within said traction elements with each of the cords of said segments extending parallel to said grooves and at a substantially uniform distance from the outer surface of said tread portion.

4. A method of building and curing at least the tread portion of a pneumatic tire of a type having in the cured condition of the tread a plurality of parallel tread grooves forming intervening traction elements and a plurality of cord tread plies arranged in overlying relation to each other with the cords of the radially outermost tread ply extending parallel to each other and angularly of at least one of the underlying tread plies, comprising the steps of locating the radially outermost tread ply in the green tread portion at a distance from the outer surface of the green tread portion substantially less than the depth of said grooves, and curing said tread portion in a mold having projections shaped to simultaneously form said grooves and separate said outermost ply laterally of the projections to provide a plurality of discrete ply segments having cords extending parallel to said grooves.

5. A method of building and curing at least the tread portion of a pneumatic tire of a type having in the cured condition of the tread portion a plurality of parallel tread grooves extending at an acute angle to the circumferential centerline of the tire to form intervening traction elements, comprising the steps of locating in the green tread portion a cord ply spaced inwardly from the outer surface of the green tread portion a distance substantially less than the depth of said grooves in the cured tread portion with the cords of said ply extending parallel to each other across said tread portion and at an angle to the centerline of said tread portion such that the cords in the cured tread portion will be parallel to said grooves, and exerting a force inwardly of said tread with a plurality of projections shaped to form said grooves and simultaneously provide a force to separate the underlying portions of said ply to divide the ply laterally of said projections into a plurality of segments, the cords of which extend parallel to said grooves.

References Cited
UNITED STATES PATENTS

| | | | |
|---|---|---|---|
| 2,756,799 | 7/1956 | Pfeiffer | 152—211 |
| 2,943,663 | 7/1960 | Antonson | 152—356 |
| 3,133,583 | 5/1964 | Dobson | 152—354 |
| 3,225,812 | 12/1965 | Barrett | 156—128 X |
| 3,261,388 | 7/1966 | Kovac et al. | 152—330 |
| 3,299,935 | 1/1967 | Bush | 152—356 |
| 3,342,239 | 9/1967 | Olagnier | 152—361 |

EARL M. BERGERT, *Primary Examiner.*

C. B. COSBY, *Assistant Examiner.*

U.S. Cl. X.R.

152—211, 354, 356, 361